April 30, 1957 W. L. WRIGHT 2,790,905

AUTOMATIC FREQUENCY CONTROL

Filed June 4, 1954 3 Sheets-Sheet 1

Inventor:
William Lea Wright
By his attorneys:
Baldwin & Wight

Inventor:
William Lea Wright
By his attorneys:
Baldwin + Wight

April 30, 1957 W. L. WRIGHT 2,790,905

AUTOMATIC FREQUENCY CONTROL

Filed June 4, 1954 3 Sheets-Sheet 3

Inventor:
William Lea Wright
By his attorneys:
Baldwin & Wight 2,790,905

AUTOMATIC FREQUENCY CONTROL

William Lea Wright, Great Baddow, England, assignor to Marconi's Wireless Telegraph Company Limited, London, England, a British company Application June 4, 1954, Serial No. 434,557

Claims priority, application Great Britain June 9, 1953

9 Claims. (Cl. 250—36)

Figure 1:
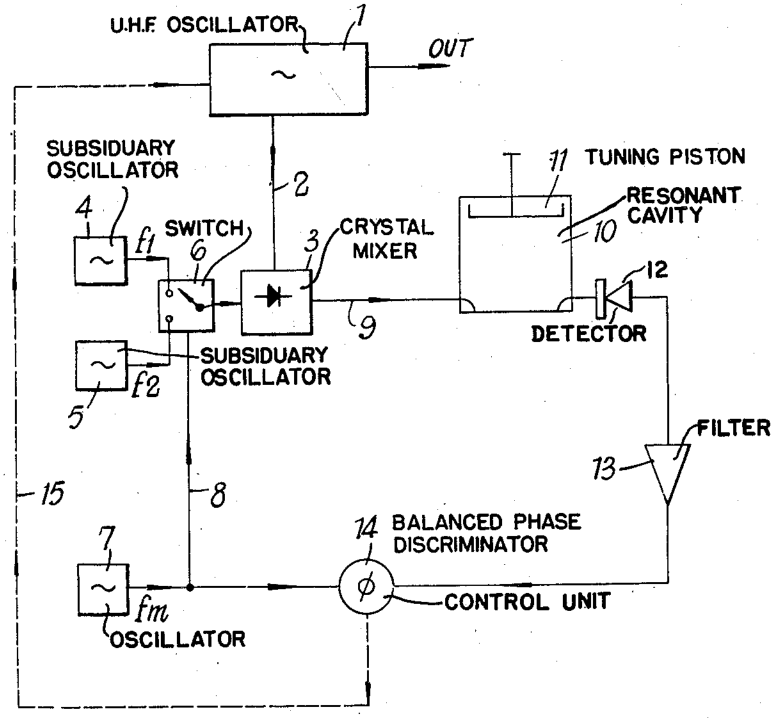

This invention relates to ultra high frequency (U. H. F.) oscillation generators and has for its object to provide improved U. H. F. oscillation generators of very high, long term, frequency stability.

It is often required, notably in electrical communication systems, radar systems, radio navigation aiding systems and micro-wave measuring equipment to provide a U. H. F. generator of high frequency stability, e. g. within ±50 c./s. per million cycles, over long periods of time. Sometimes an unmodulated stable frequency is required while in other cases the oscillations are frequency modulated with respect to a mean or average frequency which is required to be stabilized. In many cases it is an operating requirement that the frequency shall be able to be changed from time to time, high frequency stability being maintained in all cases.

These requirements are extremely difficult to satisfy and although numerous forms of U. H. F. oscillation generators with automatic frequency control systems of one type or another have been proposed, few of them provide the required high degree of long term stability and, so far as the present applicants are aware, none yet proposed has been able to satisfy all the requirements above mentioned without excessive complexity and cost, or without being difficult of maintenance or adjustment or otherwise unsuited to general commercial use. The present invention seeks to satisfy the onerous requirements above mentioned by relatively simple and inexpensive apparatus.

According to this invention a stabilized U. H. F. oscillation generator arrangement comprises a main U. H. F. oscillator, adapted for operation at a predetermined output frequency to be stabilized, two subsidiary oscillators adapted for operation at two frequencies, one for each subsidiary oscillator, which are both low in relation to said output frequency and different from one another, means for mixing oscillations from the main oscillator with oscillations from each of said subsidiary oscillators alternately, the alternation being effected at a frequency which is low in relation to those of the oscillations from the subsidiary oscillators. The system of the invention employs a sharply resonant device resonant at a frequency which is removed from said output frequency by an amount equal to the mean of the two subsidiary oscillator frequencies, means for feeding the resultants of the mixing to said sharply resonant device, a detector fed with output from said sharply resonant device, and means responsive to the output from said detector for controlling the frequency of the main oscillator to maintain said output from said detector substantially at zero.

Preferably the sharply resonant device is a resonant cavity. Preferably also the said device is of adjustable resonant frequency.

The alternate mixing of the oscillations from the subsidiary oscillators with those from the main oscillator may be effected by using continuously running subsidiary oscillators and a modulator or electronic or other switch operated at low frequency to take the subsidiary oscillator outputs alternately at said low frequency to a mixer to which oscillations from the main oscillator are fed. In another arrangement of the invention the subsidiary oscillators may be permanently connected to the mixer and keyed on and off alternately at low frequency or the subsidiary oscillators may be connected to the mixer through channels which are keyed or gated on and off in alternation at the low frequency.

Figures 2, 3:
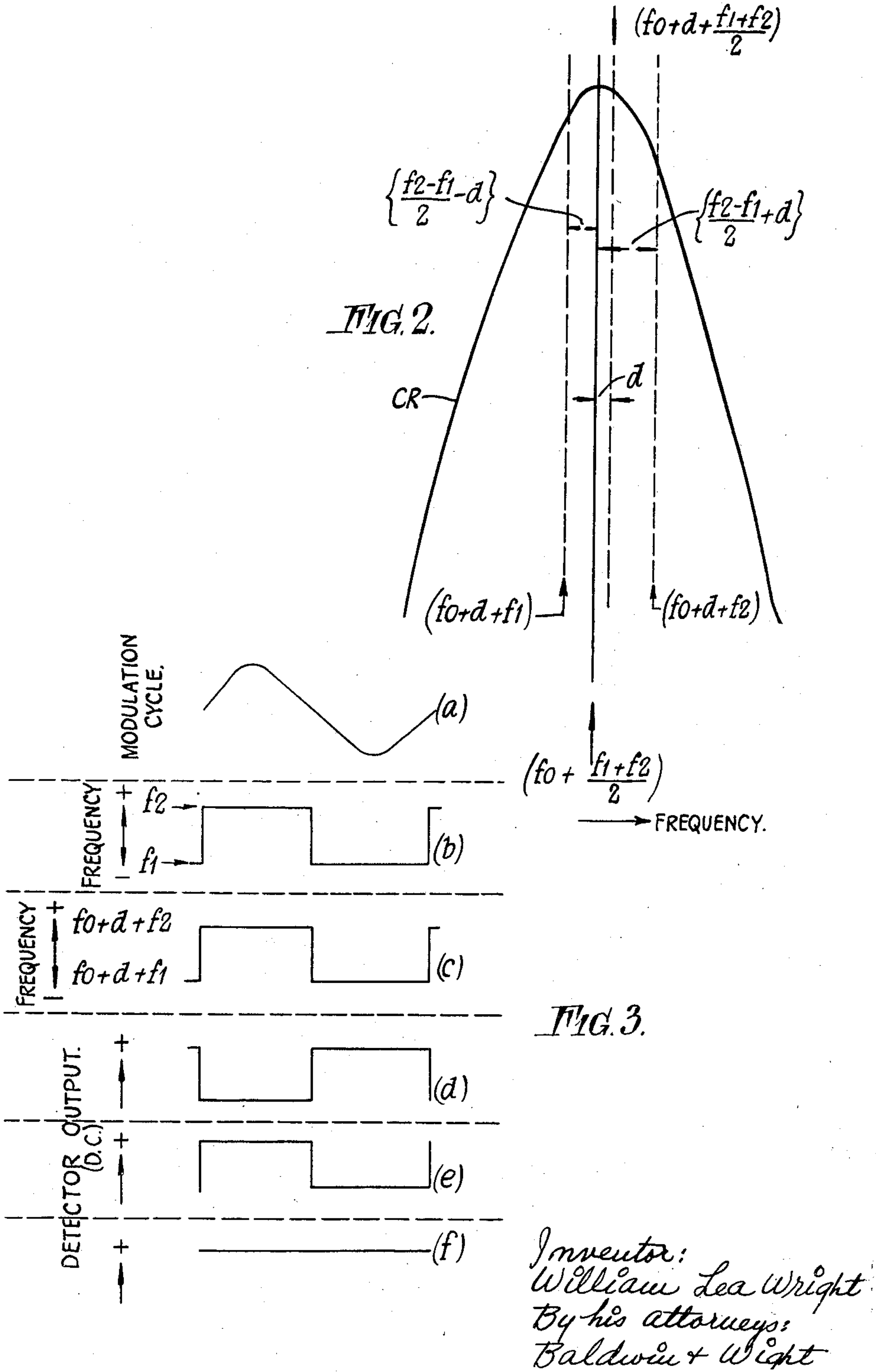
Figures 4, 5:
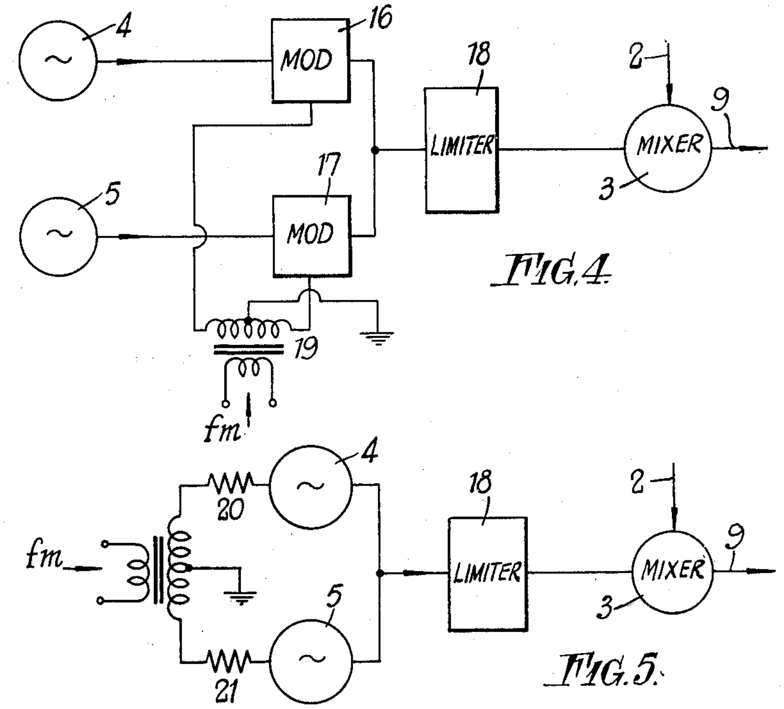
Figure 6:
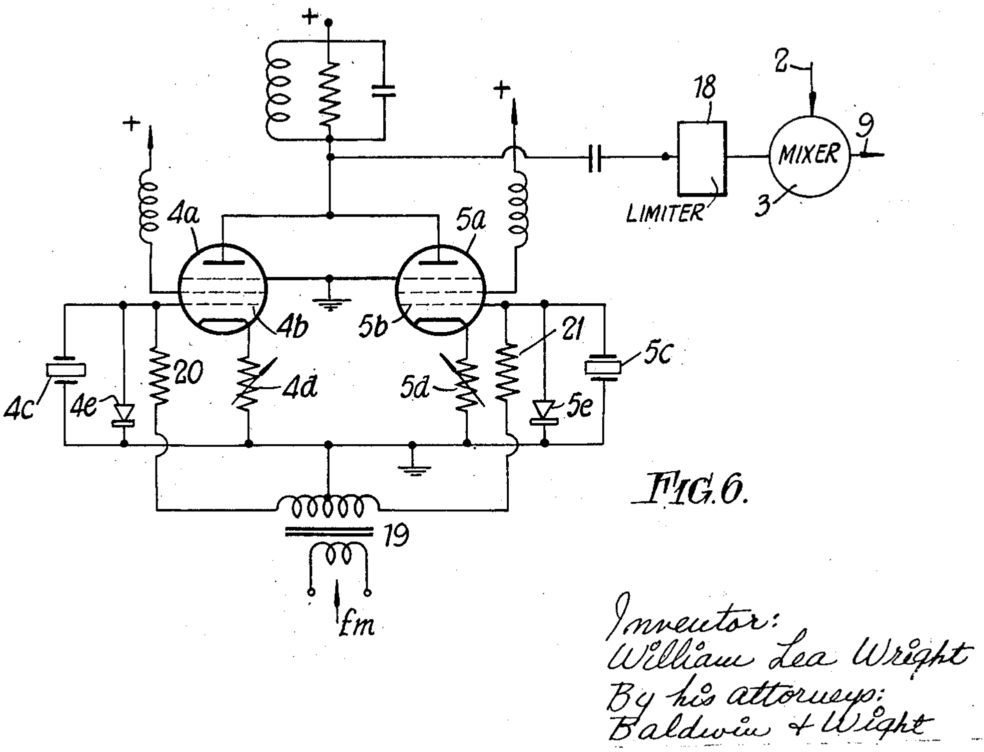

The invention is illustrated in the accompanying drawings, in which Fig. 1 is a block diagram of one embodiment of the invention, Figs. 2 and 3 are explanatory graphical figures, and Figs. 4 to 6 inclusive show detail variants. Like references indicate like parts throughout.

Referring to Fig. 1, block 1 represents the main U. H. F. oscillator which is to be stabilized at a frequency $f_0$ and which may be of any known suitable type capable of frequency control within a desired range of frequency which is at least equal to the expected range of drift or other variation of frequency of said main oscillator. To quote a practical figure purely by way of example, the intended value of $f_0$ may be 2000 mc./s. Useful output from the oscillator 1 is taken over the channel marked Out to utilization apparatus (not shown). Output is also taken from oscillator 1 over channel 2 to a crystal mixer 3. There are two subsidiary oscillators 4 and 5, which are preferably crystal stabilized oscillators, running continuously at frequencies $f_1$ and $f_2$ respectively. If $f_0$ is 2000 mc./s. $f_1$ and $f_2$ may be, for example, 20 mc./s. and 25 mc./s. respectively. The second input to the mixer 3 is provided by the oscillators 4 and 5 in alternation. This alternation is effected by a modulator or electronic or other switch 6 represented schematically as a two way switch, which is operated at a low frequency $f_m$ provided by a low frequency generator 7 over lead 8.

The output from mixer 3 is taken over lead 9 to a resonant cavity 10 represented as tunable by a piston 11. This cavity is the frequency reference device of the system and is resonant at a frequency which differs from $f_0$ by an amount equal to the mean of $f_1$ and $f_2$ i. e. the cavity is resonant either at $$f_0+\frac{f_1+f_2}{2}$$

or at $$f_0-\frac{f_1+f_2}{2}$$

For convenience in description it will be assumed that selection of the former frequency $$f_0+\frac{f_1+f_2}{2}$$

is made. Output from the cavity 10 is detected by a detector 12 and the detected output passed through a narrow band amplifier or filter 13 adapted to pass the frequency $f_m$. The output from device 13 and low frequency from the oscillator 7 are fed to a control unit 14 which controls the frequency of the oscillator 1 to maintain the output amplitude from unit 13 substantially at zero. The control unit 14 may be a balanced phase discriminator such as a ring modulator adapted to produce a D. C. output which is used to control the frequency of the oscillator 1 e. g. if this oscillator is a reflex klystron tube the D. C. output may be applied to the reflector electrode of that valve. Alternatively, the frequency control may be electro-mechanical, unit 14 being a two phase motor with its two phases fed respectively from devices 13 and 7 and being mechanically geared to a tuning element in the oscillator 1 to drive the same if both its phases are energized. The frequency control "link" between control unit 14 and oscillator 1 is represented by the broken line 15.

With this arrangement, if the frequency of the oscillator 1 is exactly $f_0$ the frequencies of alternately fed to the cavity 10 in the region of its resonance frequency will be separated from said frequency by $$\frac{f_2-f_1}{2}$$

one higher and one lower than said resonance frequency, one on either side of the resonance frequency. If, however, the oscillator 1 drifts from $f_0$ by an amount $d$— if its output becomes, for example $f_0+d$, the frequencies alternately fed to the cavity will be $(f_0+d+f_1)$ and $(f_0+d+f_2)$ the lower frequency being separated from cavity resonance by $$\frac{f_2-f_1}{2}-d$$

and the upper frequency being separated from cavity resonance by $$\frac{f_2-f_1}{2}+d$$

This is shown in Fig. 2 in which CR represents the amplitude-frequency response curve of the cavity. The amplitudes of the oscillations from oscillators 4 and 5 as fed to the cavity are equalized and accordingly the amplitudes of the alternately appearing output "side-bands" $(f_0+d+f_1)$ and $(f_0+d+f_2)$ from the cavity will be different if $d$ has any value other than zero since the amplitude response of the cavity is greater for one frequency (in the case illustrated, the lower one $f_0+d+f_1$) than for the other. If, however, $d$ is zero i. e. the oscillator 1 is operating at the correct frequency the two output "side bands" are of the same amplitude.

If $d$ has a real value and the situation is as shown in Fig. 2, there is increased output from the detector 12 when oscillator 4 is switched in than when oscillator 5 is switched in. The operation will be clear from Fig. 3 from which it will be seen that there will be a constant D. C. level of the output from detector 12 only if the oscillator 1 is correctly tuned i. e. $d=0$. In Fig. 3 line (*a*) represents a cycle of the low frequency $f_m$; line (*b*) the switched subsidiary oscillation frequencies $f_1$ and $f_2$; line (*c*) the resultant switched frequencies applied to the cavity; line (*d*) the demodulated output from detector 12 if $d$ has a real positive value; line (*e*) the demodulated output from detector 12 if $d$ has a real negative value; and line (*f*) the demodulated output from detector 12 when $d=0$. It will be observed that in line (*f*) there is no component of frequency $f_m$ while, since the components of lines (*d*) and (*e*) are in 180° relative phase, exact phasing is not of primary importance. It is preferred to provide a phase shift adjustment in the unit 13 to enable adjustment to be made to give optimum phasing at the terminals of the phase discriminating unit 14.

In order to obtain long term stability of the order of ±50 parts in a million the change in output levels at the output of the mixer 3, over the keyed modulation cycle due to the switching of the subsidiary oscillators, should not exceed about 2½% when the mixer is working into a load which is not frequency selective. It is therefor advisable to provide automatic gain control (which may be of any form well known per se) of the input to this mixer or alternatively to feed the mixer through an amplitude limiter.

Electronic switching at frequency $f_m$ by the unit 6 may conveniently be effected by using, for said unit, a pair of pentode or hexode valves with their anodes connected in a common circuit, applying the frequency $f_m$ in phase opposition to two corresponding grids, one in each of said valves, to "open" them alternately, and applying the outputs from the oscillators 4 and 5 to two other corresponding grids of said valves, one in each. The modulating signal wave $f_m$, shown as a sign wave in line (*a*) of Fig. 2 may be "squared" by any known form of squaring stage before application to the appropriate valve grids in unit 3, the amplitude of the squared wave being sufficient to cut the valves on and off over a very short portion of the sine wave cycle. The system will operate without such squaring but squaring is preferred as resulting in better sensitivity and stability.

The frequencies of the subsidiary oscillators 4 and 5 should be high enough to ensure that the amplitudes of the oscillations from the main oscillator 1 and of the lower side bands produced in the mixer 3 are of no operating significance when applied to the cavity 10, assuming, as was assumed above, that its resonance is chosen at the arithmetic mean of the two upper side band frequencies, namely, at $$f_0+\frac{f_1+f_2}{2}$$

The figures already given ($f_0$=2000 mc./s., $f_1$=20 mc./s. and $f_2$=25 mc./s.) are satisfactory from this point of view. The separation of $f_1$ and $f_2$ is not critical and may be chosen according to design requirements.

Figs. 4 to 6 inclusive show by way of example forms of keying at the frequency $f_m$. In Fig. 4 each subsidiary oscillator 4 or 5 feeds through a modulator 16 or 17 respectively to a common limiter or automatic gain controlled stage 18 to the mixer 3. The modulators 16, 17 are controlled in phase opposition by the frequency $f_m$ which is fed thereto through the transformer 19 the secondary of which has its center tapped so as to feed in push-pull.

In Fig. 5 the oscillators 4 and 5 are switched on and off alternately. As already stated they may be quartz controlled valve oscillators. They are driven by a large amplitude drive of frequency $f_m$ through transformer 19 and in each grid lead is included a grid limiting resistance 20 or 21. Fig. 6 shows in more detail suitable circuits which may be used for the oscillators 4 and 5 in Fig. 5. In Fig. 6 each oscillator includes a pentode **4*a* or 5*a* the control grids 4*b*, 5*b* of which are driven in phase opposition through transformer 19 by the frequency $f_m$, 20 and 21 being the similarly referenced limiting resistances of Fig. 5. The frequency determining crystals for the two oscillators are shown at 4*c* and 5*c* respectively. Resistance 4*d* and 5*d* in the cathode return leads enable the oscillators to be adjusted conveniently to equality of output amplitude. If desired diode or crystal rectifiers 4*e*, 5*e* may be provided across the crystals 4*c*, 5*c*** respectively to limit the modulation swing.

The main advantages of the system described are:

1. A high degree of long term stability is obtained.
2. The system is simple, rugged and well suited to hard commercial use.
3. It is essentially a "reference phase" device and does not suffer from the drift effects characteristic of discriminators employing balanced ultra high frequency detectors.
4. It does not require the provision of any modulating crystals of precisely known, unchanging characteristics.
5. Any change of characteristic of the mixing crystal which will normally be employed for the mixer 3 does not influence the stabilized frequency since any such change will equally affect both frequencies $f_0+f_1$ and $f_0+f_2$. Similarly changes in level of $f_0$, $f_1$ or $f_2$ will not alter the center frequency of stabilization, provided that the relative level of $f_1$ and $f_2$ is not changed.
6. Other than the possible use of mechanical control of the unit 1 the system is entirely electrical.

While I have described my invention in certain of its preferred embodiments I realize that modifications may be made and I desire that it be understood that no limitations upon my invention are intended other than may be imposed by the scope of the appended claims.

I claim:

1. A stabilized U. H. F. oscillation generator arrangement comprising a main U. H. F. oscillator, adapted for operation at a predetermined output frequency to be stabilized, two subsidiary oscillators adapted for operation at two frequencies, one for each subsidiary oscillator, which are both low in frequency with relation to said output frequency and different in frequency from one another, means for mixing oscillations from the main oscillator with oscillations from each of said subsidiary oscillators alternately, the alternation being effected at a frequency which is low in frequency in relation to the frequency of the oscillations from the subsidiary oscillators, a sharply resonant device resonant at a frequency which is removed from said output frequency by an amount equal to the mean of the two subsidiary oscillator frequencies, means for feeding the frequency resultants of mixing to said sharply resonant device, a detector fed with output from said sharply resonant device, and means responsive to the output from said detector for controlling the frequency of the main oscillator to maintain said output from said detector substantially at zero.

2. A generator arrangement as claimed in claim 1, wherein the sharply resonant device is a resonant cavity.

3. A generator arrangement as claimed in claim 1, and further comprising a mixer connected to receive oscillations from the main oscillator, connections between the subsidiary oscillators and the mixer, and means for keying the subsidiary oscillators on and off alternately at low frequency.

4. A generator arrangement as claimed in claim 1, and further comprising a mixer connected for receiving oscillations from the main oscillator, channels connecting the subsidiary oscillators to the mixer, and means for keying the channels on and off in alternation at low frequency.

5. A generator arrangement as claimed in claim 1, and further comprising a low frequency generator producing "squared" waves for effecting said alternation.

6. A generator arrangement as claimed in claim 1, wherein the subsidiary oscillators run continuously, the arrangement further comprising a switch, a mixer connected to receive oscillations from the main oscillator, and means for operating the switch at low frequency to feed the subsidiary oscillator outputs alternately at this low frequency to the mixer.

7. A generator arrangement as claimed in claim 1, wherein the subsidiary oscillators run continuously, the arrangement further comprising a switch, a mixer connected to receive oscillations from the main oscillator, anl means for operating the switch at low frequency to feed the subsidiary oscillator outputs alternately at this low frequency to the mixer, and further comprising an amplitude limiter connected between the mixer and the subsidiary oscillators.

8. A generator arrangement as claimed in claim 1, wherein the responsive means comprises narrow band pass means adapted to pass the alternation frequency, a control unit fed from the pass means, and connections from the control unit to the main oscillator whereby the frequency of the latter is controlled.

9. A generator arrangement as claimed in claim 1, wherein the responsive means comprises narrow band pass means adapted to pass the alternation frequency, a control unit fed from the pass means, and connections from the control unit to the main oscillator whereby the frequency of the latter is controlled, and wherein the control unit is connected also to be continuously fed with a signal at said alternation frequency and is constituted by a balanced phase discriminator adapted to produce a D. C. output controlling the frequency of the main oscillator.

References Cited in the file of this patent

UNITED STATES PATENTS

| | | |
|---|---|---|
| 2,356,201 | Beers | Aug. 22, 1944 |
| 2,404,568 | Dow | July 23, 1946 |
| 2,410,817 | Ginzton et al. | Nov. 12, 1946 |
| 2,424,833 | Korman | July 29, 1947 |
| 2,475,074 | Bradley et al. | July 5, 1949 |